United States Patent [19]

Hasiuk

[11] Patent Number: 5,203,282

[45] Date of Patent: Apr. 20, 1993

[54] DISPOSABLE LITTER CONTAINER

[76] Inventor: Aaron S. Hasiuk, 1310 Frost Hallow Rd., Levittown, Pa. 19101

[21] Appl. No.: 793,209

[22] Filed: Nov. 18, 1991

Related U.S. Application Data

[63] Continuation-in-part of Ser. No. 657,524, Feb. 20, 1991.

[51] Int. Cl.⁵ .............................................. A01K 29/00
[52] U.S. Cl. ................................................ 119/168
[58] Field of Search ............... 119/165, 167, 168, 169, 119/170; 220/666, 85 B

[56] References Cited

U.S. PATENT DOCUMENTS

| | | |
|---|---|---|
| 216,227 | 6/1979 | Sedgwick . |
| 3,014,516 | 12/1961 | Mueller . |
| 3,480,059 | 11/1969 | Schoening . |
| 3,581,977 | 6/1971 | Kirsky et al. ........................ 229/37 |
| 4,161,157 | 7/1979 | Haugen ............................. 119/165 |
| 4,271,787 | 6/1981 | Wellman ........................... 119/165 |
| 4,522,150 | 6/1985 | Gershman . |
| 4,541,360 | 9/1985 | Higgins . |
| 4,667,622 | 5/1987 | Breault . |
| 4,711,198 | 12/1987 | Mossbarger . |
| 4,724,955 | 2/1988 | Martin . |
| 4,739,725 | 4/1988 | Fennelly . |
| 4,760,816 | 8/1988 | Rhodes . |
| 4,776,300 | 10/1988 | Braddock . |
| 4,782,788 | 11/1988 | Arcand . |
| 4,787,335 | 11/1988 | Carlyon . |
| 4,792,082 | 12/1988 | Williamson ...................... 119/168 X |
| 4,800,842 | 1/1989 | Jones, Jr. .............................. 119/168 |
| 4,846,103 | 7/1989 | Brown . |
| 4,884,527 | 12/1989 | Skirvin .................................. 119/168 |
| 4,940,016 | 7/1990 | Heath . |
| 5,014,649 | 5/1991 | Taft ....................................... 119/168 |
| 5,065,702 | 11/1991 | Hasiuk ................................... 119/168 |

FOREIGN PATENT DOCUMENTS 2618050  1/1989 France ................................. 119/168

Primary Examiner—Gene Mancene
Assistant Examiner—Thomas Price
Attorney, Agent, or Firm—Paul and Paul

[57] ABSTRACT

An extensible disposable litter container receives the waste of household pets, such as oats. The container is extensible from a closed position to an open position, and includes a rectangular tray for litter, and a cover which is releasably attached to the tray when the container is closed. The sides and ends of the cover are collapsible, and bias the container open when the cover is released from the closed position. A pair of rotatable tabs lock the sides open.

5 Claims, 3 Drawing Sheets

DISPOSABLE LITTER CONTAINER

This application is a continuation-in-part of U.S patent application Ser. No. 07/657,524, filed Feb. 19, 1991.

BACKGROUND OF THE INVENTION

1. Field of the Invention

The present invention relates generally to animal care, and more particularly to containers for litter for receiving the waste of household pets.

2. Brief Description of the Prior Art

Litter boxes are well known to urban pet owners, and in particular cat owners. Litter boxes typically contain a granular adsorbent material for adsorbing pet waste and the accompanying odors. Often an open box is used, with the result that odor control is at best only partially effective, whatever the specific material used as an adsorbent. Animals are apt to scatter soiled litter and waste from open boxes when entering or leaving the boxes, and by instinctively "digging" into the adsorbent.

The animal waste itself represents a potential health hazard to the pet owner and others, and especially to pregnant women.

Closed boxes large enough to accomodate household pets such as cats can be difficult and uneconomical to manufacture, store and ship. On the other hand there is a need for an easy to use enclosed container for pet litter which can reduce the potential health hazards associated with contact with the animal waste, and which can be readily disposed of after use. Numerous attempts have been made to address the problem. For example, U.S. Pat. Nos. 3,581,977, 4,711,198, 4,782,788, 4,846,103, and 4,940,016 each provide collapsible, disposable litter boxes. However, each of these has significant shortcomings. For example, the litter box shown in U.S. Pat. No. 4,940,016 requires multiple tabs between sides and portions of the top of the container to be engaged when the container is opened, and disengaged when the container is closed prior to being discarded. This can be time-consuming and potentially very frustrating. Similarly, the box shown in U.S. Pat. No. 4,846,103 requires several steps to set up or take down. The box shown in U.S. Pat. No. 4,711,198 appears very easy to set up and take down, but provides only limited room for the animal inside the box, given the amount of floor space it requires. The boxes of U.S. Pat. Nos. 3,581,977 and 4,782,788 are each only partially enclosed. There is a continuing need for an easy-to-use disposable litter container, which protects against exposure to soiled litter and the dust associated with it.

SUMMARY OF THE INVENTION

The present invention provides an extensible disposable litter container for receiving the waste of household pets, such as cats. The container can be sealed after use and collapsed for disposal without scattering soiled litter dust, and thus reduces the likelihood of infection through litter dust-transmitted diseases.

The container is extensible from a closed position to an open position, and includes a rectangular tray having a floor and opposing sides and ends for containing litter material, as well as a cover member having a top and generally rectangular opposing sides and ends. The opposing sides and ends are folded inward when the container is in the closed position, and are extensible from the closed position. Each of the opposing sides has an extension means affixed thereto. In one embodiment, each of the extension means comprises a tab which can be grasped to pull out the side and straighten it as the container is being opened. Preferably, each tab is rotatable from a first position perpendicular to the top of the cover member and against the side of the cover member to a second position perpendicular to the side which is affixed so as to lock the side in the open position. The cover member is releasably attached to the tray when the container is in the closed position.

The cover member has at least one vent communicating with the atmosphere, preferably adapted to prevent or reduce the passage of litter dust therethrough by permitting the passage of air.

One end of the cover member has a door formed therein for entry and egress of household pets.

The folded sides and ends of the cover member provide an extensive force so as to at least partially extend the cover member away from the tray when the cover member is released from the tray and the container assumes the open position.

Preferably, the container is shipped with the door in the closed position. The cover member can be provided with releasable adhesive means for securing the door in the closed position during shipment and prior to use. To permit pets to use the container, the door is opened and bent back over the end and top. Preferably, the cover member is provided with fastener means for affixing the door in an open position.

After use of the container, the door is released from the open position and closed. Preferably, the cover member is provided with adhesive means for permanently affixing the door in a closed position after use and prior to disposal, and thus sealing the door closed against the passage of litter dust from the interior. Preferably, the vent member permits air to be expelled from the interior of the container when the container is being closed, but prevents the escape of dust from the soiled litter.

DETAILED DESCRIPTION

Figure 1:
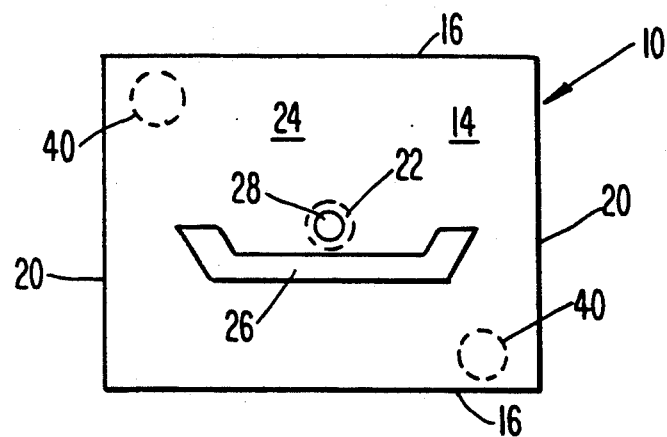
FIG. 1 is a front elevational view of a first embodiment of the container of the present invention shown in a closed position.

Referring now to the drawings in detail, wherein like reference numerals indicate like elements in each of the several views, reference is first made to FIG. 1, wherein a container 10 according to the present invention is shown in a front elevational view in a closed position. The container 10 is preferably shipped to the consumer encased in a flexible packaging material such as cellophane or the like (not shown), which is removed by the consumer prior to use.

The container 10 includes a rectangular lower tray 12 containing an adsorbent litter material such as clay (not shown) and a rectangular cover member or cover 14. A pair of paper seals 15 adhere to the sides of both the tray 12 and the cover 14 during shipment. These are broken by the consumer after the container 10 is removed from its packaging.

The rectangular tray 12 can be about twelve inches by sixteen inches, and deep enough to contain about two inches of litter material. The rectangular cove 14 has a pair of opposed sides 16, a pair of opposed ends 20, and a top 24 from which extends a handle 26 for opening and carrying the container 10. After the container 10 is removed from the packaging and the seals 15 are broken, the consumer lifts on the handle 26 to pull the cover 14 away from the tray 12 to open the container 10.

A vent or air valve 28 is formed in the top 24 to permit air to enter the container 10 when it is opened and to escape when it is closed. The vent 28 can simply be a hole cut in the top 24 of the cover 14; however, a one-way valve responsive to a pressure difference between the interior of the container 10 and the atmosphere is preferably employed. A filter 22 formed from a circle of fibrous filter material adhered to the underside of the cover 14 over the vent 28 restrict litter dust from being forced out the vent 28 when the container 10 is closed.

The rectangular lower tray 12 has pairs of opposed sides 30 and ends 32 and a floor 34, and is sized to fit within the cover 14 when the container 10 is closed. The sides 30 of the tray 12 have a plurality of detents 36 formed therein for securing the cover 14 to the tray 12 when the container 10 is closed after the litter material has become soiled. The sides 16 of the cover 14 include a plurality of cutouts 38, each for receiving a corresponding detent 36. As shown in the plan view of FIG. 2, under the top 24 of the cover 14 there are a pair of helical spring means or springs 40 extending from the underside of the top 24 of the cover 14 to the floor 34 of the tray 12. When the container 10 is closed, these springs 40 are compressed. However, as soon as the seals 15 are broken, the springs 40 bias the container 10 to an open position, as shown in the perspective view of FIG. 3. The handle 26 can be simply cut from the top 24 of the cover 14, as shown in FIG. 2, with the handle 26 being bent upward (as shown in FIG. 1) just prior to initially opening the container 10.

Figure 3:
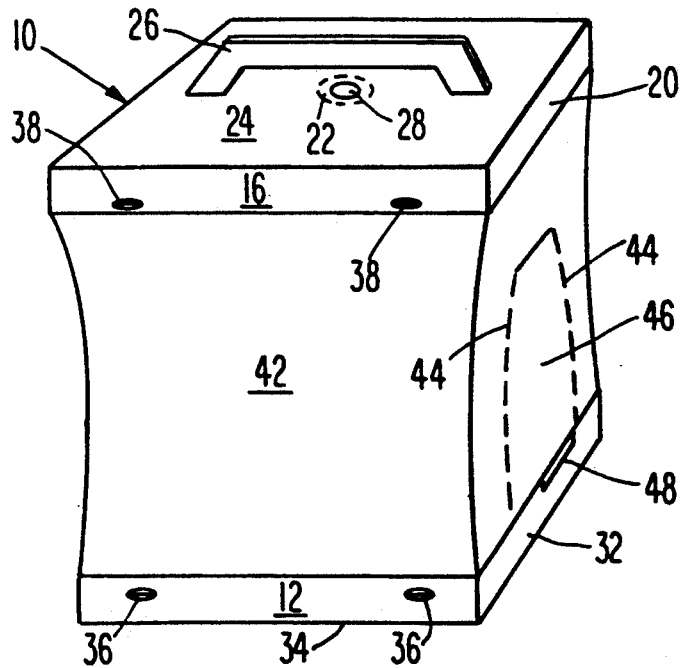
FIG. 3 is a perspective view of the container of FIG. 1 shown in an open position.

As seen in FIG. 3, a generally cylindrical, collapsible wall 42 extends between the tray 12 and the cover 14, enclosing the interior of the container 10 when the container is in the open position. The wall 42 has perforations 44 extending in a pair of generally parallel vertical lines in a portion of the wall 42 extending between corresponding ends 20, 32 of the cover 14 and tray 12 respectively, the vertical lines being connected by a horizontal line of perforations positioned proximate the end 32 of the tray 12. A tab 48 is permanently affixed to the wall 42 within the perforations 44, and releasably affixed with a resealable adhesive to the end 32 of the tray 12. To open the container 10 to permit an animal to enter, the tab 48 is firmly grasped and lifted upward to tear the perforations 44 to form a door 46 in the wall 42. The tab 48 has resealable adhesive on both its inside and outside surfaces, permitting the door 46 to be fastened in a open position by lifting the door 46 up and back over the top 24 of the cover 14 and adhering the tab 48 to the cover 14 (not shown). If desired, the perforations can be arranged so that the door opens to the side (not shown). Alternatively, a hook or latch can be can by substituted for the tab 48 so that the door 46 can be secured in an open or closed position (not shown).

To close the container 10 prior to disposal after the litter within it has been soiled, the tab 48 is lifted from the cover 14, and the door 46 is closed and the tab 48 is reattached to the tray 12. The cover 14 is then simply pushed down, compressing the springs 40, until the detents 36 engage their corresponding cutouts 38, the collapsing wall 42 being guided inward away from the detents 36.

Figure 2:
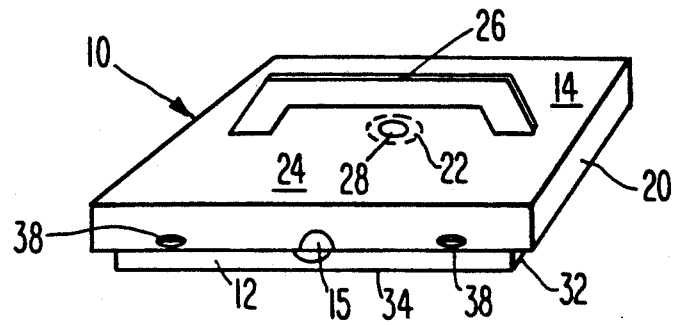
FIG. 2 is a plan view of the container of FIG. 1.

The tray 12 and cover 14 are preferably formed from a lightweight, rigid material such as cardboard or a rigid plastic material, while the wall 42 of the container shown in FIGS. 1-3 is preferably formed from flexible plastic film stock. If cardboard is used to form the tray 12, it is preferably treated with a moisture barrier-forming substance such as a wax coating, or lined with a mosture-impervious plastic sheet, so that moisture is retained within the container 10. Alternatively, the wall 42 is closed at its bottom. The wall 42 is secured to the cover 14 and the tray 12 by conventional means, such as by an adhesive, by ultrasonic welding, or the like.

Figure 4:
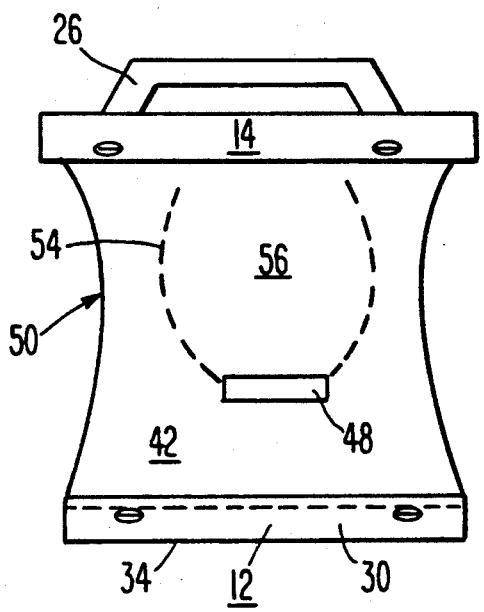
FIG. 4 is a front elevational view of a second embodiment of the container of the present invention shown in an open position.

FIG. 4 illustrates a second embodiment of the present invention. The container 50 has a door 56 formed in wall 42 between corresponding sides 16, 30 of the cover 14 and tray 12 respectively. In this case, the door 56 is bounded by an arc of perforations 54 and set in the upper two-thirds of the wall 42, and the additional height of the door 56 above the tray 12 reduces the amount of litter 58 which is scattered out of the container 50 by an animal using the container 50.

Figure 5:
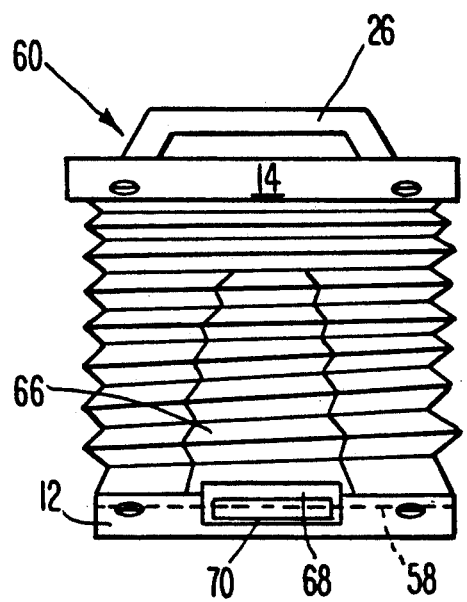
FIG. 5. is a front elevational view of a third embodiment of the container of the present invention shown in an open position.
Figure 6:
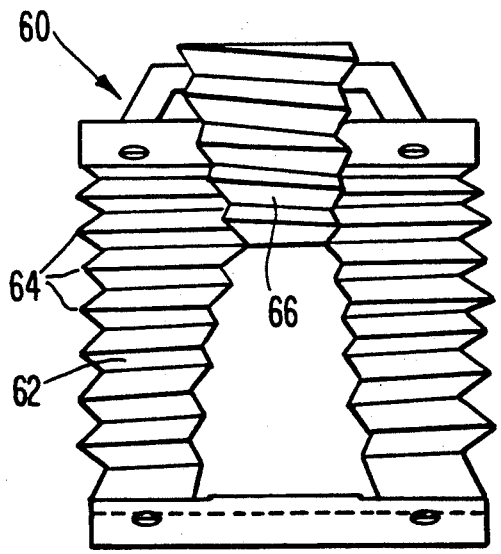
FIG. 6 is a front elevational view of the container of FIG. 5 shown in an open position with its door open.
Figure 7:
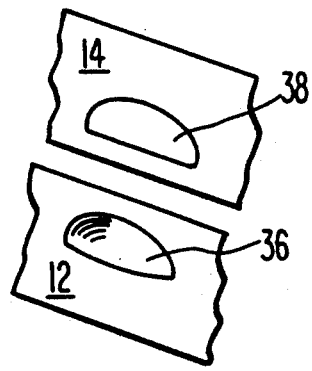
FIG. 7 is a fragmentary isometric view of the container of FIG. 1 showing a detent for sealing the closed container.

A third embodiment of the container of the present invention is shown in FIG. 5. In this case, the container 60 has a wall 62 formed with a plurality of concertina pleats 64 and from a semi-rigid plastic material. The rigidity of the wall 62 opposes compression, and wall 62 itself serves as a biasing or spring means to push the container 60 and keep the container 60 in an open position when the detents 36 have been released. Accordingly, there is no need for internal springs to accomplish this function in this version of the container. The container 60 has a door 66 formed in wall 62 and having a tab 68 releasably and resealably securing the door 66 to one of the sides 30 of the tray 12. The tab 68 has a piece of release paper 70 covering a pad of adhesive material adhered to the outside surface of the tab 68. When the door 66 is opened, such as shown in FIG. 6, the release paper 70 is removed to permit the door to be bent back over the wall 62 and the cover 14 and secured to the cover 14 with the pad of adhesive material. After the litter 58 inside the container 60 has become soiled, the door 66 is closed, and the cover 14 is pressed down onto the tray 12 until the detents 36 engage the corresponding cutouts 38. The accordian-pleated wall 62 is compressed, with the folds 64 advantageously opposing the increased pressure within the container 60 as it is compressed, so that the no portions of the wall 62 become positioned between the detents 36 and the cutouts 38 as the container 60 is closed.

FIG. 6 is a expanded, fragmentary view of one of the interengaging detents 36 and cutouts 38 shown as the container is being closed.

Figure 8:
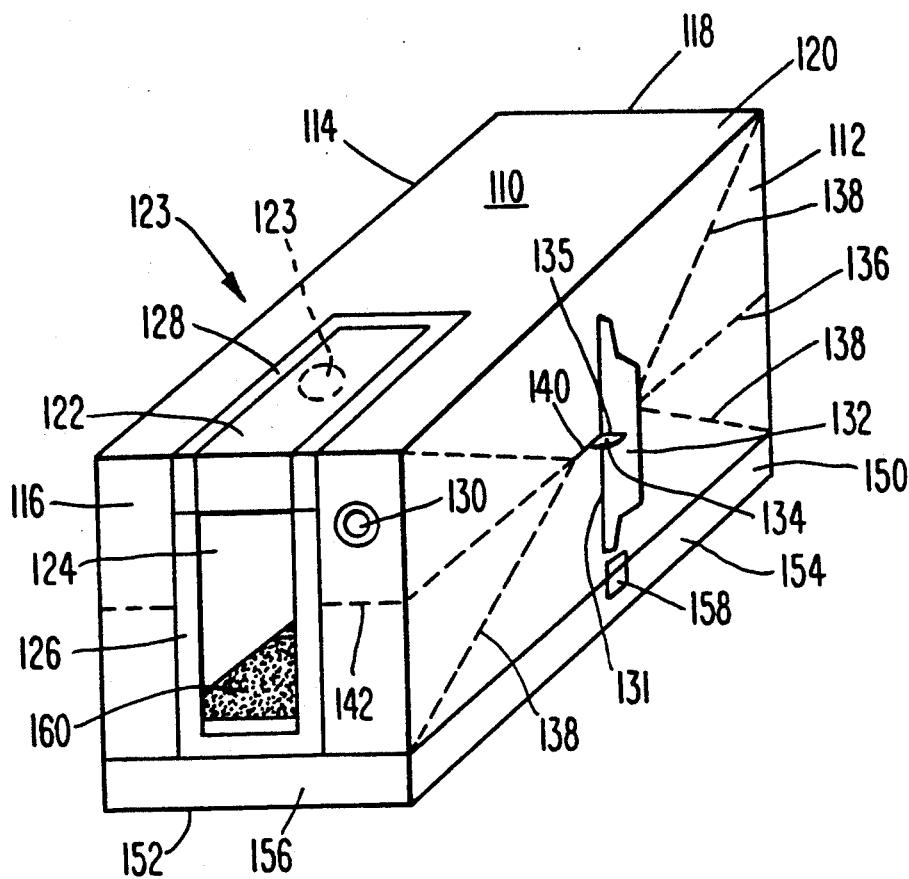
FIG. 8 is a perspective view of a fourth embodiment of the container of the present invention shown in an open position.

A perspective view of a fourth embodiment of a container 100 of the present invention is shown in an open position in FIG. 8. The same container 100 is shown in a closed position in FIG. 9. The container 100 includes a rectangular tray 150 having a floor 152 and opposing, generally rectangular sides 154 and ends 156 for containing litter material 160. The tray 150 is preferably formed of a waterproof or water-resistant material, such as suitable coated card stock or cardboard.

The container 100 also includes a cover member 110 having generally rectangular opposing sides 112, 114 and ends 116, 118 and a generally rectangular top 120. The cover member 110 can be formed by die-cutting an uncoated grade of cardboard or card stock. One end 116 of the cover member 110 has a door 122 cut from the card stock of the end 116 to provide an opening 124 for entry and egress of animal pets.

Double-sided adhesive tape 126 covered with release paper is applied to the container end 116 proximate the opening 124. Single-sided adhesive tape 128 is applied around the edges of the front surface of the door 122 so that the single-sided tape 128 extends beyond the edges of the door 122 and lies upon the release paper of the double-sided adhesive tape 126 when the container 100 is shipped for use with the door 122 closed (not shown). In the alternative, a releasable grade of adhesive material is printed on the end 116 in the region bordering the opening 124. Similarly, the single-sided adhesive tape 128 can be replaced with a flexible plastic film or the like which will securely but releasably engage the double-sided adhesive tape 126 or the printed adhesive on the end 116.

Figure 9:
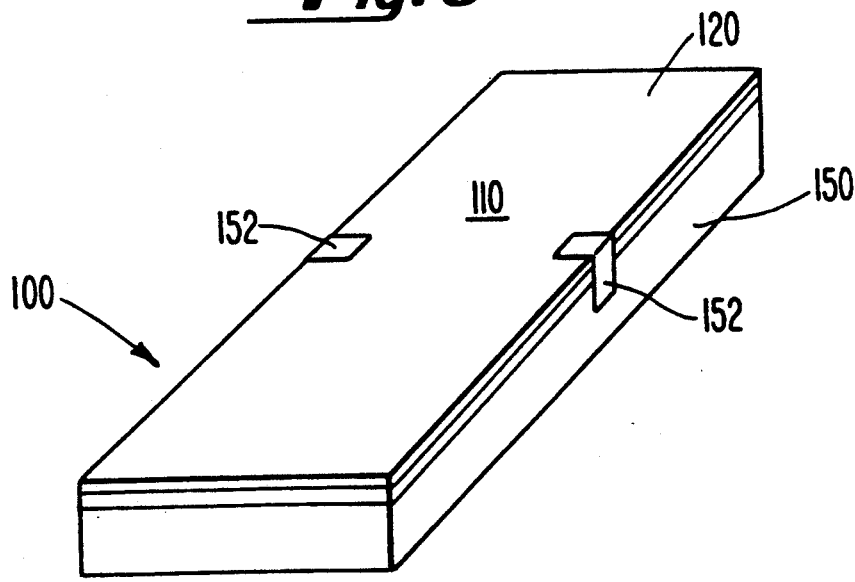
FIG. 9 is a perspective view of the container of FIG. 8 shown in the closed position.

The sides 112, 114 and ends 116, 118 of the cover member 110 are provided with a plurality of fold lines 136, 138, 140, 142 so that after the tray 150 and cover member 110 have been manufactured and assembled, and the container 100 filled with litter material 160, the cover member 110 can be easily collapsed onto the tray 150 against the opposing force being exerted by the folding stock material, and the cover member 100 is secured to the tray 150 by a plurality of releasable tape sections 152 (FIG. 9).

As the container 100 is being collapsed, air from the interior of the container 100 is expelled through a vent member 130 positioned in an end 116 of the cover member 110. To use the container 100, a consumer detaches or breaks the tape sections 152, permitting the cover member 110 to pop up away from the tray 150 at least far enough so that the consumer can grasp each of a pair of extension means or pull tabs 132 secured to respective sides 112, 114 of the cover member 110. Alternatively, other extension means such as pull strings fastened to the sides (not shown) can be used. As the cover member 110 extends, air flows into the container 100 through the vent member 130.

A pair of second tabs 134 are affixed to respective sides 112, 114 of the cover member 110 and extend parallel to the plane of the top 120 of the cover member 110, and through slots 135 formed in the respective pull tabs 132. During assembly of the container 100 the pull tabs 132, which are affixed along an inner edge 131 to the respective sides 112, 114 of the cover member 110 perpendicular to the plane of the top 120 of the cover member 110, are folded to lie against the sides 112, 114 of the cover member 110. When the container 100 is opened, the pull tabs 132 are rotated away from the sides 112, 114, the slots 135 formed in the pull tabs 132 permitting the pull tabs 132 to pass over and along the respective second tabs 134, to lock the cover member 110 is an open or extended position.

Preferably, the fold lines 136, 138, 140, 142 are positioned so that the cover member 110 is an unstable equilibrium position when "fully extended," in the sense that the sides 112, 114 and ends 116, 118 of the cover member 110 each lie in a respective plane, with the actual full open or extended position being one in which at least one of the respective sides 112, 114 and ends 116, 118 "puckers" slightly in the direction opposite that in which it was folded in the closed position.

The "spring constant" of the sides 112, 114 and ends 116, 118 can be adjusted by varying the thickness and/or "hand" of the stock employed in manufacturing them. Alternatively, one or more pairs of the fold lines 138, 138, 140, 142 can be replaced by slits in the stock, the slits being taped over seal them, and to alter or enhance the extensibility of the cover member 110.

After the cover member 110 has been fully extended, the consumer opens the door 122 and folds it back over the end 116 and top 120 of the cover member 110. Preferably, fastening means 123 such as a Velcro ® fastener or a dab of releasable adhesive is provided to secure the door 122 in the open position while the container 100 is being used by a pet.

When the litter material 160 is judged exhausted by the consumer, the release paper on the double-sided adhesive tape 126 bordering the opening 124 is removed, and the door 122 closed, the single-sided tape 128 extending around the door 122 engaging the double-sided tape 126 to provide a seal against dust. The cover member 110 is then collapsed by pushing the pull tabs 132 inward against the sides 112, 114 of the cover member 110 while pressing down on the top 120, and subsequently reapplying the tape sections 152 or otherwise securing the container 100 closed, as by applying an elastic band or the like.

Preferably, the vent member 130 permits air to pass, but blocks the passage of litter dust while the container 100 is being closed.

Various modifications can be made in the details of the embodiments of the container of the present invention, all within the spirit and scope of the appended claims. For example, the cover and the tray can be circular or elliptical in shape, rather than being rectangular. Similarly, the litter can be packaged separately from the container, with the container being filled with litter only after it is opened up, thus reducing the shipping weight of the container.

I claim:

1. An extensible disposable litter container for receiving the waste of household pets, the container being extensible from a closed position to an open position, the container comprising:

a rectangular tray having a floor and opposing sides and ends for containing litter material;

a unitary cover member having a top and generally rectangular opposing collapsible sides and opposing collapsible ends, each of the opposing collapsible sides having an extension means affixed thereto, the cover member being releasably attached to the tray when the container is in the closed position, the cover member having at least one vent communicating with the atmosphere; one end of the cover member having a door formed therein for entry and egrees of household pets; the walls and ends of the cover member being folded when the container is in the closed position, the folded walls and ends of the cover member providing an extensive force so as to at least partially extend the cover member away from the tray when the cover member is released from the tray and the container assumes the open position, the folded walls and ends of the cover member being joined at respective edges thereof when the cover member is in the closed position, the cover member consequently not requiring assembly when extended from the closed position to the open position.

2. A container according to claim 1 wherein the extension means comprises a pair of tabs rotatable to lock a respective opposing collapsible side in the open position.

3. A container according to claim 1 wherein the cover member is provided with fastener means for affixing the door in an open position.

4. A container according to claim 1 wherein the cover member is provided with adhesive means for permanently affixing the door in a closed position after use.

5. A container according to claim 1 further comprising animal litter material within the tray.

* * * * *